United States Patent
Shi (10) Patent No.: US 12,004,135 B2
(45) Date of Patent: Jun. 4, 2024

(54) INFORMATION INDICATION METHOD, DEVICE AND TERMINAL

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 594 days.

(21) Appl. No.: 17/165,836

(22) Filed: Feb. 2, 2021

(65) Prior Publication Data
US 2021/0160873 A1 May 27, 2021

Related U.S. Application Data (63) Continuation of application No. PCT/CN2018/100080, filed on Aug. 10, 2018.

(51) Int. Cl.
*H04W 72/0453* (2023.01)
*H04W 76/30* (2018.01)

(52) U.S. Cl.
CPC ....... *H04W 72/0453* (2013.01); *H04W 76/30* (2018.02)

(58) Field of Classification Search
CPC .................................. H04W 28/10; H04L 1/08
USPC ...................................................... 455/452.1
See application file for complete search history.

(56) References Cited

U.S. PATENT DOCUMENTS

| | | | |
|---|---|---|---|
| 2015/0016369 A1 | 1/2015 | Park et al. | |
| 2017/0078066 A1 | 3/2017 | Park et al. | |
| 2019/0379519 A1* | 12/2019 | Shi | H04L 5/0098 |
| 2019/0386779 A1* | 12/2019 | Hong | H04W 28/0263 |
| 2020/0099484 A1* | 3/2020 | Yi | H04W 76/15 |
| 2020/0367305 A1* | 11/2020 | Jin | H04L 1/1867 |

FOREIGN PATENT DOCUMENTS

| | | |
|---|---|---|
| CN | 105101253 A | 11/2015 |
| CN | 107567041 A | 1/2018 |

OTHER PUBLICATIONS

International Search Report in the international application No. PCT/CN2018/100080, mailed on May 8, 2019.
3GPP TSG-RAN WG2 AH 1807, Tdoc R2-1810180, Ericsson, "LCP restrictions for duplication and non-duplication", mailed on Jul. 6, 2018.
3GPP TSG-RAN WG2 AH 1807, Tdoc R2-1810181, Ericsson, "Correction for LCP restriction for duplication and non-duplication", mailed on Jul. 6, 2018.
3GPP TSG-RAN2 Meeting #102, R2-1806873, OPPO, "LCP restriction for type 2 configured grant", mailed on May 25, 2018.
(Continued)

*Primary Examiner* — Fabricio R Murillo Garcia
(74) *Attorney, Agent, or Firm* — PERKINS COIE LLP (57) ABSTRACT

Provided in the embodiments of the present application are an information indication method, device and terminal. The method includes: determining, by a terminal according to first indication information, whether to release a mapping relationship between a first logical channel and a first physical carrier set, after receiving a first message used for indicating deactivation of a duplicate data transmission function.

16 Claims, 8 Drawing Sheets

(56) References Cited

OTHER PUBLICATIONS

First Office Action of the Chinese application No. 202110320999.8, issued on Mar. 24, 2022. 14 pages with English translation.
Nokia, Nokia Shanghai Bell, " PDCP data duplication in LTE ", 3GPP TSG-RAN WG2 #99bis R2-1711001, Oct. 13, 2017, 4 pages.
OPPO, "Details of the duplication control MAC CE", 3GPP TSG RAN WG2 #99 R2-1707741, Aug. 25, 2017, 4 pages.
Written Opinion of the International Search Authority in the international application No. PCT/CN2018/100080, mailed on May 8, 2019. 6 pages with English translation.
CATT, "Duplication Activation/Deactivation MAC CE", 3GPP TSG-RAN WG2 #99 R2-1707921, Berlin, Germany, Aug. 21-25, 2017. 5 pages.
Second Office Action of the Chinese application No. 202110320999.8, issued on Jul. 5, 2022. 10 pages with English translation.
Nokia, Nokia Shanghai Bell, Samsung "Clarifications on (de)activation of Duplication and (de)activation of SCells" 3GPP TSG-RAN WG2 Meeting #102 R2-1808829, Busan, South Korea, May 21-25, 2018. 3 pages.
Notice of Allowance of the Chinese application No. 202110320999.8, issued on Sep. 28, 2022. 6 pages with English translation.

* cited by examiner

A terminal determines, according to first indication information, whether to release a mapping relationship between a first logical channel and a first physical carrier set, after receiving a first message used for indicating deactivation of a duplicate data transmission function — 301

INFORMATION INDICATION METHOD, DEVICE AND TERMINAL

CROSS-REFERENCE TO RELATED APPLICATIONS

The application is a continuation application of PCT Application No. PCT/CN2018/100080 filed on Aug. 10, 2018, the disclosure of which is hereby incorporated by reference in its entity.

BACKGROUND

In carrier aggregation duplication (CA duplication) transmission, duplicate data transmitted by different logical channels are transmitted on different physical carriers. Based on this, the network side needs to configure a mapping relationship between logical channels and physical carriers where one logical channel may have a mapping relationship with at least one physical carrier (referred to as a physical carrier set). However, when a duplicate data transmission function of a logical channel is deactivated, such a mapping relationship with carriers limits carrier transmission resources of the logical channel.

SUMMARY

The present disclosure generally relates to the field of mobile communication technology, and specifically to, a method, apparatus and terminal for information indication.

The method for information indication provided by the embodiments of the disclosure includes: determining, by a terminal according to first indication information, whether to release a mapping relationship between a first logical channel and a first physical carrier set, after receiving a first message used for indicating deactivation of a duplicate data transmission function.

The apparatus for information indication provided by the embodiments of the disclosure includes: a memory storing processor-executable instructions; and a processor configured to execute the stored processor-executable instructions to perform an operation of: determining, according to first indication information, whether to release a mapping relationship between a first logical channel and a first physical carrier set, after receiving a first message used for indicating deactivation of a duplicate data transmission function.

BRIEF DESCRIPTION OF THE DRAWINGS

The drawings described herein are used to provide a further understanding of the disclosure and form a part of the disclosure. The exemplary embodiments and descriptions thereof are adopted to explain the disclosure and not intended to form improper limits to the present disclosure. In the attached drawings.

DETAILED DESCRIPTION

The technical solutions in the embodiments of the disclosure will be described below in conjunction with the drawings in the embodiments of the disclosure. Obviously, the described embodiments are a part of the embodiments of the disclosure, not all of the embodiments. Based on the embodiments in the disclosure, all other embodiments obtained by those of ordinary skilled in the art without creative work shall fall within the protection scope of the disclosure.

The technical solutions of the embodiments of the disclosure may be applied to various communication systems, such as a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, a Frequency Division Duplex (FDD) system, an LTE Time Division Duplex (TDD), a Universal Mobile Telecommunication System (UMTS), a Worldwide Interoperability for Microwave Access (WiMAX) communication system or a 5G system, etc.

Figure 1:
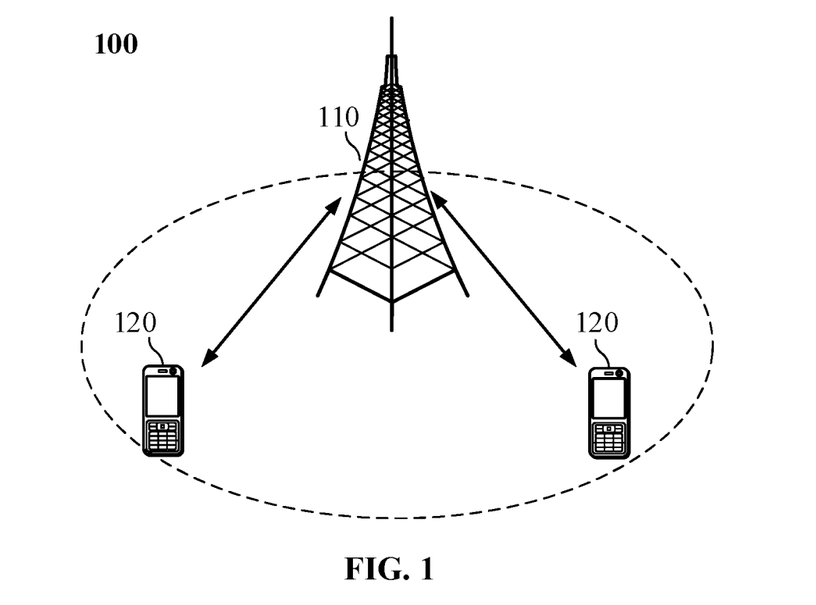
FIG. 1 is a schematic diagram of a communication system architecture provided by an embodiment of the disclosure.

Exemplarily, the communication system 100 applied in the embodiment of the disclosure is shown in FIG. 1. The communication system 100 may include a network device 110, herein the network device 110 may be a device that communicates with a terminal 120 (or called a communication terminal or terminal). The network device 110 may provide communication coverage for a specific geographic area, and may communicate with terminals located within the coverage area. In an embodiment, the network device 110 may be a Base Transceiver Station (BTS) in a GSM system or a CDMA system, or a NodeB (NB) in a WCDMA system, an Evolutional Node B (eNB or eNodeB) in an LTE system, or a wireless controller in the Cloud Radio Access Network (CRAN), or the network device may be a mobile switching center, a relay station, an access point, an in-vehicle device, a wearable device, a hub, a switch, a bridge, a router, a network-side device in 5G networks or a network device in the future enhanced Public Land Mobile Network (PLMN), etc.

The communication system 100 further includes at least one terminal 120 located within the coverage of the network device 110. "Terminal" as used herein includes but is not limited to an apparatus that is configured to receive or send communication signals via wired line connections, such as via Public Switched Telephone Networks (PSTN), Digital Subscriber Lines (DSL), digital cables, direct cable connections and/or another data connections/networks; and/or via wireless interfaces, such as wireless interfaces configured for cellular networks, wireless local area networks (WLAN), like digital TV network of DVB-H networks, satellite networks, AM-FM broadcast transmitters and/or another terminal and/or Internet of Things (IoT) device. A terminal set to communicate via a wireless interface may be referred to as a "wireless communication terminal", a "wireless terminal" or a "mobile terminal". Examples of mobile terminals include but are not limited to satellites or cellular phones; Personal Communications System (PCS) terminals that can combine cellular radio phones with data processing, fax, and data communication capabilities; PDA that includes radio phones, pagers, Internet/intranet access, Web browser, memo pad, calendar, and/or Global Positioning System (GPS) receiver; and conventional laptop and/or palmtop receivers or other electronic apparatuses including radio telephone transceivers. The terminal may refer to access terminals, user equipment (UE), user units, user stations, mobile stations, mobile platforms, remote stations, remote terminals, mobile device, user terminals, terminals, wireless communication device, user agents or user apparatuses. The access terminal may be cellular phones, cordless phones, Session Initiation Protocol (SIP) phones, Wireless Local Loop (WLL) stations, personal digital assistants (PDA), handheld devices with wireless communication functions, computing devices or other processing devices connected to wireless modems, in-vehicle devices, wearable devices, terminals in 5G networks, or terminals in the future enhanced PLMN, etc.

In an embodiment, a communication mode of Device to Device (D2D) may be performed between the terminals 120.

In an embodiment, the a 5G system or a 5G network may also be referred to as a New Radio (NR) system or an NR network.

FIG. 1 exemplarily shows one network device and two terminals. In an embodiment, the communication system 100 may include multiple network devices, and other numbers of terminals may be included in the coverage of each network device, which are not limited in the embodiment of the disclosure.

In an embodiment, the communication system 100 may further include other network entities such as a network controller and a mobility management entity, which are not limited in the embodiment of the disclosure.

It should be understood that the devices with communication functions in the network/system in the embodiments of the disclosure may be referred to as communication devices. Taking the communication system 100 shown in FIG. 1 as an example, the communication device may include a network device 110 and a terminal 120 with communication functions, herein the network device 110 and the terminal 120 may be the specific devices described above, which will not be repeated here. The communication device may further include other devices in the communication system 100, such as other network entities like network controllers and mobility management entities, which are not limited in the embodiment of the disclosure.

It should be understood that the terms "system" and "network" herein are often used interchangeably. The term "and/or" herein is only an association relationship describing associated objects, which means that there may be three relationships. For example "A and/or B" may have three meanings: A exists alone, A and B exist at the same time and B exists alone. In addition, the character "/" herein generally indicates that the associated objects before and after the character "/" are in an "or" relationship.

In order to facilitate the understanding of the technical solutions of the embodiments of the disclosure, the CA duplication technology involved in the embodiments of the disclosure will be described below.

Figure 2:
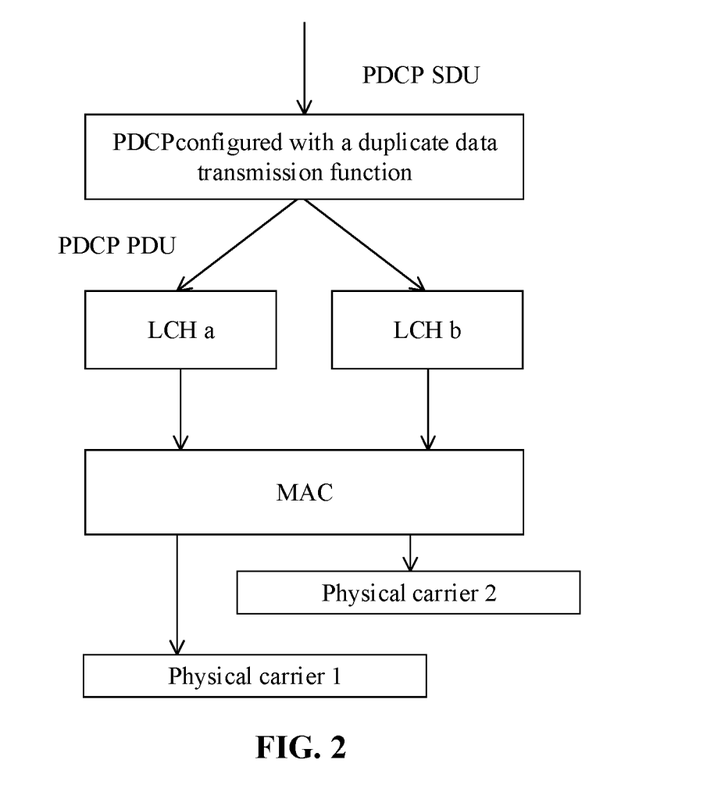
FIG. 2 is a schematic diagram of transmission of CA duplication provided by an embodiment of the disclosure.

In the CA duplication transmission, in order to transmit duplicate data transmitted by different logical channels on different physical carriers, the network side configures the mapping relationship between logical channels and physical carriers through a Radio Resource Control (RRC) signaling. Referring to FIG. 2, a Packet Data Convergence Protocol (PDCP) layer is configured with a duplicate data transmission function. After the PDCP service data unit (SDU) is processed by the PDCP layer, a PDCP protocol data unit (PDU) is generated and the same PDCP PDU (called the duplicated PDCP PDU) is generated through duplication. Then, the PDCP PDU is transmitted through logical channel (LCH) a, and the duplicated PDCP PDU is transmitted through LCH b. The LCH a may only be transmitted on the physical carrier 1, and the LCH b may only be transmitted on the physical carrier 2. Herein, one logical channel mapped to one physical carrier is taken as an example. The embodiment of the disclosure is not limited thereto. One logical channel may be mapped to multiple physical carriers.

In the embodiments of the disclosure, when receiving a first message used for indicating the deactivation of a duplicate data transmission function, the terminal needs to consider releasing a mapping relationship between the logical channel and the physical carrier, so that data of a logical channel is capable of being transmitted on all authorized carriers.

Figure 3:
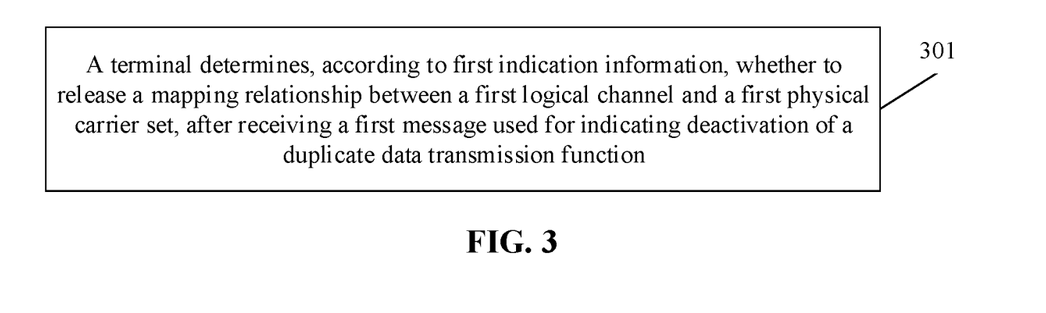
FIG. 3 is a schematic flowchart of a method for information indication provided by an embodiment of the disclosure.

FIG. 3 is a schematic flowchart of a method for information indication provided by an embodiment of the disclosure. As shown in FIG. 3, the method for information indication includes the following operations.

In S301, the terminal determines, according to first indication information, whether to release a mapping relationship between a first logical channel and a first physical carrier set, after receiving a first message used for indicating deactivation of a duplicate data transmission function.

In the embodiment of the disclosure, the terminal may be any device capable of communicating with the network, such as a mobile phone, a tablet computer, a vehicle-mounted terminal and a laptop.

In the embodiment of the disclosure, the terminal receives the first message used for indicating the deactivation of a duplicate data transmission function sent by a base station. Herein, the base station may be, but is not limited to, a gNB in 5G.

In the embodiment of the disclosure, the first message is an MAC CE or an RRC signaling.

Taking the first message being the MAC CE as an example, the MAC CE used for indicating the deactivation of the duplicate data transmission function is called a duplication deactivation MAC CE.

Taking the first message being the RRC signaling as an example, the network side may indicate, through the RRC signaling, to the terminal the deactivation of the duplicate data transmission function.

In the embodiment of the disclosure, after receiving the first message, the terminal deactivates the duplicate data transmission function of the PDCP layer.

In the embodiment of the disclosure, after receiving the first message used for indicating the deactivation of the duplicate data transmission function, the terminal determines, according to first indication information, whether to release a mapping relationship between a first logical channel and a first physical carrier set. The implementation of the first indication information is described below.

In manner 1, the first indication information is carried in the MAC CE or in an MAC CE used for indicating the deactivation of the duplicate data transmission function.

Figure 4:
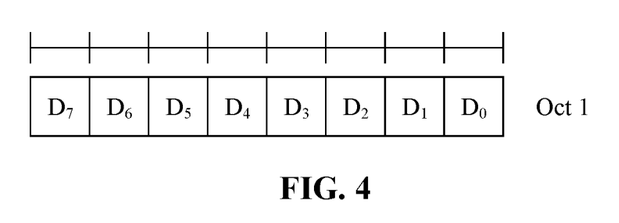
FIG. 4 is a format diagram of a Media Access Control Control Element (MAC CE) of the first message provided by an embodiment of the disclosure.

Referring to FIG. 4, FIG. 4 illustrates a format of an activation/deactivation MAC CE. The MAC CE is an 8-bit bitmap. Each bit in the bitmap corresponds to one data radio bearer (DRB). The DRB is a DRB configured with a duplicate data transmission function. Each bit in the bitmap may be set to 0 or 1. Herein, a bit set to 1 indicates that the duplicate data transmission function of the DRB corresponding to the bit is activated, and a bit set to 0 indicates that the duplicate data transmission function of the DRB corresponding to the bit is deactivated. The bits in the bitmap correspond to DRB IDs in an ascending order. For example, the terminal is configured with three DRBs with the duplicate data transmission function and the IDs of these three DRBs are 1, 4 and 7 respectively, then DRB ID 1 corresponds to D0, the DRB ID 4 corresponds to D1, and the DRB ID 7 corresponds to D2.

Figure 5:
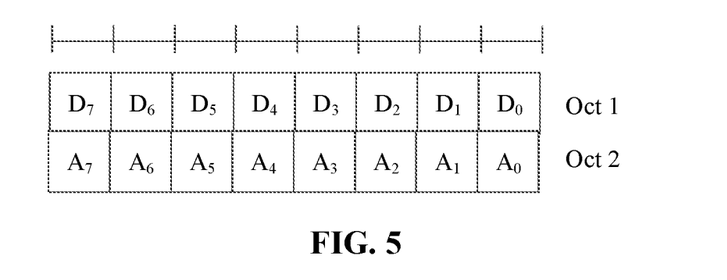
FIG. 5 is a format diagram of an MAC CE of the first message carrying first indication information provided by an embodiment of the disclosure.

For the above manner 1, the first indication information is carried in the MAC CE, and the first message may be a bitmap of the same size as the bitmap of the activation/deactivation MAC CE, as shown in FIG. 5, herein A0 to A7 constitute the bitmap of the first message, each bit corresponds to the activation/deactivation bit. A may be set to 0 or 1. If A is set to 0, it means that when a duplicate data transmission function of a DRB corresponding to A is activated, a logical channel associated with the DRB releases the correspondence with the first physical carrier set. If A is set to 1, it means that when the duplicate data transmission function of the DRB corresponding to A is deactivated, the logical channel associated with the DRB does not release the correspondence with the first physical carrier set. It can be seen that, the bit is valid only when the duplicate data transmission function of the DRB corresponding to the bit is deactivated.

In the above solution, one bitmap is used for indicating whether to release the correspondence between the logical channel and the first physical carrier set, and another bitmap is used for indicating whether the duplicate data transmission function of the DRB is deactivated. In an implementation mode, these two bitmaps are combined into one MAC CE and then transmitted to the terminal together. In another implementation mode, the bitmap indicating whether to release the correspondence between the logical channel and the first physical carrier set and the bitmap in the activation/deactivation MAC CE are respectively transmitted to the terminal in different MAC CEs. In other words, the above-mentioned bitmap used for indicating whether to release the correspondence between the logical channel and the first physical carrier set can be combined with the bitmap in the activation/deactivation MAC CE to synthesize a 16-bit bitmap, and then placed in the activation and deactivation MAC CE and transmitted to the terminal, as the format shown in FIG. 5. Alternatively, the bitmap used for indicating whether to release the correspondence between the logical channel and the first physical carrier set may be separately placed in a respective MAC CE and transmitted to the terminal.

In manner 2, the first indication information is carried in an RRC signaling used for indicating deactivation of duplicate data transmission function.

The first indication information is carried in the RRC signaling. The first indication information may be in the information element PDCP-config. The content of the information element PDCP-config is as follows.

```
-- ASN1START
-- TAG-PDCP-CONFIG-START
PDCP-Config  ::=           SEQUENCE  {
    moreThanOneRLC         SEQUENCE  {
        primaryPath             SEQUENCE  {
            cellGroup               CellGroupId              OPTIONAL,    -- Need R
            logicalChannel          LogicalChannelIdentity   OPTIONAL     -- Need R
        },
        ul-DataSplitThreshold  UL-DataSplitThreshold     OPTIONAL,  -- Cond  SplitBearer
        pdcp-Duplication       BOOLEAN                   OPTIONAL   -- Need R
        applyCellRestriction-DuplicationDeactivated  Boolean OPTIONAL  - Need R
    }               OPTIONAL,   -- Cond   MoreThanOneRLC
[omitted]
-- TAG-PDCP-CONFIG-STOP
-- ASN1STOP
```

In the embodiment of the disclosure, a variable of applyCellRestriction-DuplicationDeactivated is added into the information element PDCP-Config, and the variable may be set to 0 or 1. If the variable is set to 1, the terminal releases the correspondence between the logical channel and the first physical carrier set after the duplicate data transmission function is deactivated; if the variable is set to 0, the terminal does not release the correspondence between the logical channel and the first physical carrier set after the duplicate data transmission function is deactivated.

If the first indication information is carried in the RRC signaling, the network side may also directly reconfigure and deactivate the duplicate data transmission function of the DRB, making it become a DRB without the duplicate data transmission function, herein the logical channel associated with the DRB is configured with the first physical carrier set.

In manner 3, the first indication information includes a first parameter configured in the first logical channel, herein a radio bearer corresponding to the first logical channel is configured with a duplicate data transmission function.

The first parameter is configured in the first logical channel. The first parameter can be in the information element LCH-Config. The content of the information element LCH-Config is as follows.

```
-- ASN1START
-- TAG-LOGICAL-CHANNEL-CONFIG-START
LogicalChannelConfig ::=      SEQUENCE  {
    ul-SpecificParameters          SEQUENCE  {
omitted
        allowedServingCells         SEQUENCE  (SIZE  (1..maxNrofServingCells-1))  OF
ServCellIndex         OPTIONAL,        -- Need  R
        allowedServingCells-Mask   BOOLEAN,  OPTIONAL,   --  Cond   Duplication
omitted
        ...
    }  OPTIONAL,   --  Cond   UL
    ...
}
--   TAG-LOGICAL-CHANNEL-CONFIG-STOP
--   ASN1STOP
```

In the embodiment of the disclosure, an allowedServingCells-Mask parameter is configured in the information element LCH-Config, and the parameter may be set to 0 or 1. If the parameter is set to 1, it means that when the duplicate data transmission function of the DRB associated with the logical channel is activated, the terminal releases the mapping relationship between the logical channel and the first physical carrier; and if the parameter is set to 0, it means that when the duplicate data transmission function of the DRB associated with the logical channel is deactivated, the terminal does not release the mapping relationship between the logical channel and the first physical carrier. As can be seen, the parameter is only valid when the DRB associated with the logical channel is configured with the duplicate data transmission function.

In the embodiment of the disclosure, after receiving the first message used for indicating to the deactivation of the duplicate data transmission function, the terminal deactivates the duplicate data transmission function of a radio bearer corresponding to the first logical channel, and determines, according to the first parameter, whether to release the mapping relationship between the first logical channel and the first physical carrier set.

Furthermore, responsive to a value of the first parameter being a first value, the mapping relationship between the first logical channel and the first physical carrier set is released; responsive to the value of the first parameter being a second value, the mapping relationship between the first logical channel and the first physical carrier set is not released.

For example, the first indication information is a variable (which may take a value of 0 or 1), and the variable is configured in the first logical channel, and the radio bearer (DRB or SRB) corresponding to the first logical channel is configured with the mode of duplicate data transmission. If the duplicate data transmission function of a radio bearer corresponding to the first logical channel is deactivated, the terminal determines, according to the value of the variable, whether to release the mapping relationship between the first logical channel and the first physical carrier set. For example, if the variable is 1, the mapping relationship between the first logical channel and the first physical carrier set is released; and if the variable is 0, the mapping relationship between the first logical channel and the first physical carrier set is not released.

In the solution of the embodiment of the disclosure, the first physical carrier set includes at least one physical carrier, for example, includes one physical carrier or includes multiple physical carriers.

In manner 4, the first indication information includes configuration information of a second physical carrier set, herein the configuration information of the second physical carrier set is configured in the first logical channel, and a radio bearer corresponding to the first logical channel is configured with the duplicate data transmission function.

The configuration information of the second physical carrier set is configured in the first logical channel, herein the configuration information of the second physical carrier set may be in the information element LCH-Config. The content of the information element LCH-Config is as follows.

```
--  ASN1START
--  TAG-LOGICAL-CHANNEL-CONFIG-START
LogicalChannelConfig  ::=  SEQUENCE  {
    ul-SpecificParameters       SEQUENCE  {
omitted
        allowedServingCells              SEQUENCE  (SIZE  (1..maxNrofServingCells-1))  OF
ServCellIndex   OPTIONAL,           --  Need  R
        allowedServingCells-Deactivation     SEQUENCE  (SIZE  (1..maxNrofServingCells-1))
OF   ServCellIndex              OPTIONAL,  --  Need  R
omitted
        ...
    }  OPTIONAL,   --  Cond   UL
    ...
}
--   TAG-LOGICAL-CHANNEL-CONFIG-STOP
--   ASN1STOP
```

In the embodiment of the disclosure, an allowedServingCells-Deactivation parameter is configured in the information element LCH-Config, the allowedServingCells-Deactivation parameter is a physical carrier set. The network side may or may not configure this parameter. If the network side configures this parameter, when the duplicate data transmission function of the DRB associated with the logical channel is deactivated, the terminal releases the mapping relationship between the logical channel and allowedServingCells, and maps the logical channel to allowedServingCells-Deactivation. If the network side does not configure this parameter, it means that when the duplicate data transmission function of the DRB associated with the logical channel is deactivated, the terminal releases the mapping relationship between the logical channel and allowedServingCells.

In the embodiment of the disclosure, after receiving the first message used for indicating the deactivation of the duplicate data transmission function, the terminal deactivates the duplicate data transmission function of a radio bearer corresponding to the first logical channel, and releases the mapping relationship between a logical channel and a first physical carrier set, and maps the first logical channel to the second physical carrier set.

Herein, after the first logical channel is mapped to the second physical carrier set, data of the first logical channel is capable of being transmitted on the second physical carrier set.

In the above solution, when the second physical carrier set is configured, a determination of the physical carrier set to which the first logical channel maps is made based on whether the duplicate data transmission function is in an activated state. Details are as follows.

1) If the radio bearer corresponding to the first logical channel is configured with the duplicate data transmission function and the duplicate data transmission function is in an activated state, the terminal restricts the data of the first logical channel to be only transmitted on the carriers in the first physical carrier set.

2) If the radio bearer corresponding to the first logical channel is configured with the duplicate data transmission function and the duplicate data transmission function is in a deactivated state, the terminal restricts the data of the first logical channel to be only transmitted on the carriers in the second physical carrier set.

In the above solution of the embodiment of the disclosure, after the mapping relationship between the first logical channel and the first physical carrier set is released, the data of the first logical channel is capable of being transmitted on all carriers configured for the terminal. It is worth noting that the release of the mapping relationship between the first logical channel and the first physical carrier set means that the first logical channel is not bound to any physical carrier set, such as the first physical carrier set or the second physical carrier set.

Figure 6:
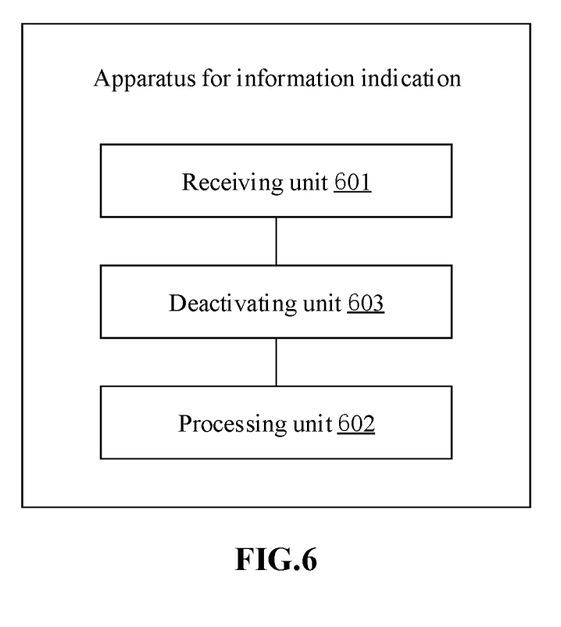
FIG. 6 is a schematic diagram showing the structural composition of an apparatus for information indication provided by an embodiment of the disclosure.

FIG. 6 is a schematic diagram showing the structural composition of an apparatus for information indication provided by an embodiment of the disclosure. As shown in FIG. 6, the apparatus includes:
  a receiving unit 601, configured to receive a first message used for indicating deactivation of a duplicate data transmission function; and
  a processing unit 602, configured to determine, according to first indication information, whether to release a mapping relationship between a first logical channel and a first physical carrier set.

In an implementation mode, the first message is an MAC CE or an RRC signaling.

In an implementation mode, the first indication information is carried in the MAC CE or in an MAC CE used for indicating the deactivation of the duplicate data transmission function; or,
  the first indication information is carried in an RRC signaling used for indicating the deactivation of the duplicate data transmission function.

In an implementation mode, the first indication information includes a first parameter is configured in the first logical channel, herein a radio bearer corresponding to the first logical channel is configured with a duplicate data transmission function.

In an implementation mode, the apparatus further includes:
  a deactivating unit 603, configured to deactivate the duplicate data transmission function of the radio bearer corresponding to the first logical channel after the first message used for indicating the deactivation of the duplicate data transmission function is received by the receiving unit 601; and
  the processing unit 602, configured to determine, according to the first parameter, whether to release the mapping relationship between the first logical channel and the first physical carrier set.

In an implementation mode, the processing unit 602 is configured to determine to release the mapping relationship between the first logical channel and the first physical carrier set, responsive to a value of the first parameter being a first value; and determine not to release the mapping relationship between the first logical channel and the first physical carrier set, responsive to the value of the first parameter being a second value.

In an implementation mode, the first indication information includes configuration information of a second physical carrier set, herein the configuration information of the second physical carrier set is configured in the first logical channel, and a radio bearer corresponding to the first logical channel is configured with the duplicate data transmission function.

In an implementation mode, the apparatus further includes:
  a deactivating unit 603, configured to deactivate the duplicate data transmission function of the radio bearer corresponding to the first logical channel after the first message used for indicating the deactivation of the duplicate data transmission function is received by the receiving unit 601; and
  the processing unit 602, configured to release the mapping relationship between the first logical channel and the first physical carrier set, and map the first logical channel to the second physical carrier set.

In an implementation mode, after the first logical channel is mapped to the second physical carrier set, data of the first logical channel is capable of being transmitted on the second physical carrier set.

In an implementation mode, after the mapping relationship between the first logical channel and the first physical carrier set is released, data of the first logical channel is capable of being transmitted on all carriers configured for the terminal.

Those skilled in the art should understand that the relevant description of the foregoing apparatus for information indication in the embodiments of the disclosure may be understood with reference to the relevant description of the method for information indication in the embodiments of the disclosure.

Figure 7:
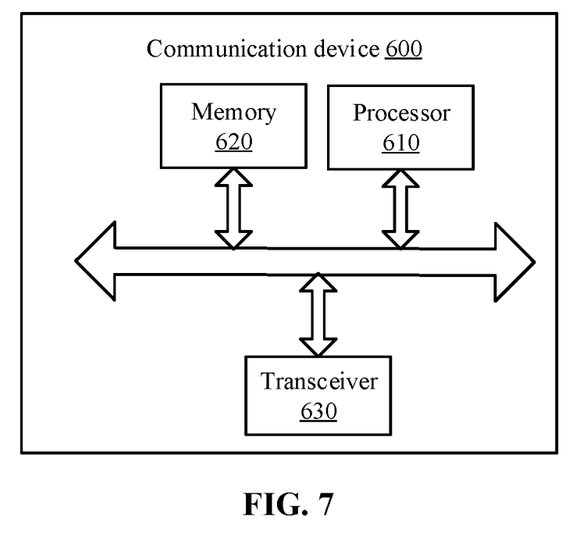
FIG. 7 is a schematic structural diagram of a communication device provided by an embodiment of the disclosure.

FIG. 7 is a schematic structural diagram of a communication device 600 provided by an embodiment of the disclosure. The communication device may be a terminal. The communication device 600 shown in FIG. 7 includes a processor 610, and the processor 610 may invoke and run computer programs from the memory to implement the method in the embodiment of the disclosure.

In an embodiment, as shown in FIG. 7, the communication device 600 may further include a memory 620. The processor 610 may invoke and run computer programs from the memory 620 to implement the method in the embodiment of the disclosure.

The memory 620 may be a separate element independent of the processor 610, or may be integrated in the processor 610.

In an embodiment, as shown in FIG. 7, the communication device 600 may further include a transceiver 630, and the processor 610 may control the transceiver 630 to communicate with other devices. Specifically, it may send information or data to other devices, or receive information or data sent by other devices.

The transceiver 630 may include a transmitter and a receiver. The transceiver 630 may further include an antenna, and the number of antennas may be one or more.

In an embodiment, the communication device 600 may specifically be a network device in an embodiment of the disclosure, and the communication device 600 may implement the corresponding procedures implemented by the network device in each method of the embodiment of the disclosure. For the sake of brevity, details are not repeated here.

In an embodiment, the communication device 600 may specifically be a mobile terminal/terminal according to an embodiment of the disclosure, and the communication device 600 may implement the corresponding procedures implemented by the mobile terminal/terminal in each method of the embodiment of the disclosure. For the sake of brevity, details are not repeated here.

Figure 8:
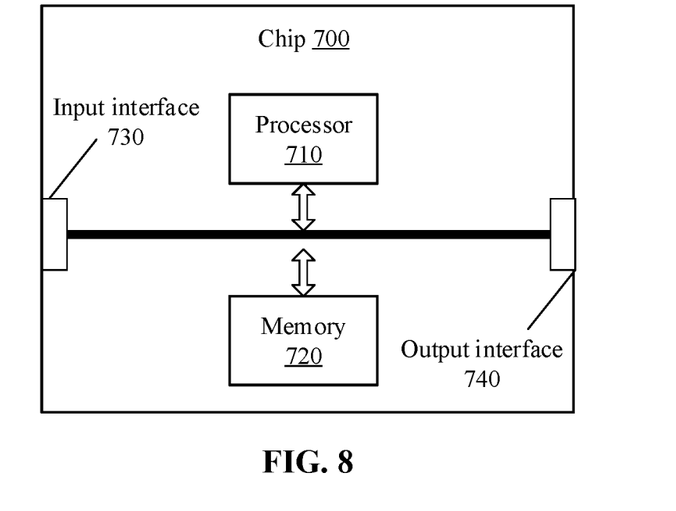
FIG. 8 is a schematic structural diagram of a chip according to an embodiment of the disclosure.

FIG. 8 is a schematic structural diagram of a chip of an embodiment of the disclosure. The chip 700 shown in FIG. 8 includes a processor 710, herein the processor 710 may invoke and run computer programs from the memory to implement the method in the embodiment of the disclosure.

In an embodiment, as shown in FIG. 8, the chip 700 may further include a memory 720. The processor 710 may invoke and run computer programs from the memory 720 to implement the method in the embodiment of the disclosure.

The memory 720 may be a separate element independent of the processor 710, or may be integrated in the processor 710.

In an embodiment, the chip 700 may further include an input interface 730. The processor 710 may control the input interface 730 to communicate with other devices or chips, and specifically, may obtain information or data sent by other devices or chips.

In an embodiment, the chip 700 may further include an output interface 740. The processor 710 may control the output interface 740 to communicate with other devices or chips, and specifically, may output information or data to other devices or chips.

In an embodiment, the chip may be applied to the network device in the embodiment of the disclosure, and the chip may implement the corresponding procedures implemented by the network device in each method of the embodiment of the disclosure. For the sake of brevity, details are not repeated here.

In an embodiment, the chip may be applied to the mobile terminal/terminal in the embodiment of the disclosure, and the chip may implement the corresponding procedures implemented by the mobile terminal/terminal in each method of the embodiment of the disclosure. For the sake of brevity, details are not repeated here.

It should be understood that the chip mentioned in the embodiment of the disclosure may also be referred to as a system-level chip, a system chip or a system-on-a-chip, etc.

Figure 9:
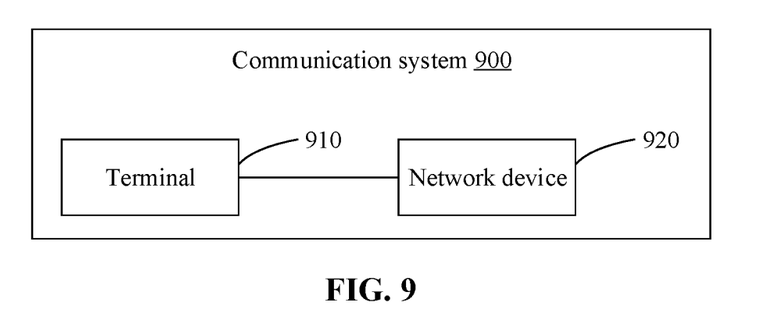
FIG. 9 is a schematic block diagram of a communication system provided by an embodiment of the disclosure.

FIG. 9 is a schematic block diagram of a communication system 900 provided by an embodiment of the disclosure. As shown in FIG. 9, the communication system 900 includes a terminal 910 and a network device 920.

The terminal 910 may be configured to implement the corresponding functions implemented by the terminal in the foregoing method, and the network device 920 may be configured to implement the corresponding functions implemented by the network device in the foregoing method. For the sake of brevity, details are not repeated here.

By applying the above technical solutions, in the duplication transmission, if a terminal receives a first message used for indicating deactivation of a duplicate data transmission function, the terminal determines, according to first indication information, whether to release a mapping relationship between a first logical channel and a first physical carrier set, so as to enable the logical channel to be capable of being transmitted on all authorized carriers.

It should be understood that the processor of the embodiment of the disclosure may be an integrated circuit chip with signal processing capability. In the implementation process, the operations of the foregoing method embodiments may be completed by indications in the form of software or the integrated logic circuits of the hardware in the processor. The above-mentioned processor may be a general-purpose processor, a digital signal processor (DSP), an application specific integrated circuit (ASIC), a field programmable gate array (FPGA) or other programming logic devices, discrete gates or transistor logic devices, or discrete hardware components. The methods, operations, and logical block diagrams disclosed in the embodiments of the disclosure may be implemented or executed. The general-purpose processor may be a microprocessor or the processor may further be any conventional processor or the like. The operations of the method disclosed in the embodiments of the disclosure may be directly embodied as being executed and completed by a hardware decoding processor, or executed and completed by a combination of hardware and software modules in the decoding processor. The software module may be located in a mature storage medium in the field such as a random access memory, a flash memory, a read-only memory, a programmable read-only memory, or an electrically erasable programmable memory or a register. The storage medium is located in the memory, and the processor reads the information in the memory and completes the operations of the above-mentioned method in combination with its hardware.

It can be understood that the memory in the embodiment of the disclosure may be a volatile memory or a non-volatile memory, or may include both volatile and non-volatile memory. Among them, the non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By way of exemplary but not restrictive description, many forms of RAM are available, such as static RAMs (SRAM), dynamic RAMs (DRAM), synchronous DRAMs (SDRAM), double data rate SDRAMs (DDR SDRAM), enhanced SDRAMs (ESDRAM), synchlink DRAMs (SLDRAM)) and direct rambus RAMs (DR RAM). It should be noted that the memories of the systems and methods described herein are intended to include, but are not limited to these and any other suitable types of memory.

It should be understood that the foregoing memory is exemplary but not restrictive. For example, the memory in the embodiment of the disclosure may further be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) or a direct rambus RAM (DR RAM), etc. That is to say, the memory in the embodiments of the disclosure is intended to include but is not limited to these and any other suitable types of memory.

The embodiment of the disclosure further provides a computer-readable storage medium for storing computer programs.

In an embodiment, the computer-readable storage medium may be applied to the network device in the embodiment of the disclosure, and computer programs cause the computer to execute the corresponding procedures implemented by the network device in each method of the embodiment of the disclosure. For the sake of brevity, details are not repeated here.

In an embodiment, the computer-readable storage medium may be applied to the mobile terminal/terminal in the embodiments of the disclosure, and the computer programs cause the computer to execute the corresponding procedures implemented by the mobile terminal/terminal in each method of the embodiment of the disclosure. For the sake of brevity, details are not repeated here.

The embodiment of the disclosure further provides computer program product, including computer program instructions.

In an embodiment, the computer program product may be applied to the network device in the embodiment of the disclosure, and the computer program instructions cause the computer to execute the corresponding procedures implemented by the network device in each method of the embodiment of the disclosure. For the sake of brevity, details are not repeated here.

In an embodiment, the computer program product may be applied to the mobile terminal/terminal in the embodiments of the disclosure, and the computer program instructions cause the computer to execute the corresponding procedures implemented by the mobile terminal/terminal in each method of the embodiment of the disclosure. For the sake of brevity, details are not repeated here.

The embodiment of the disclosure further provides a computer program.

In an embodiment, the computer program may be applied to the network device in the embodiment of the disclosure. When the computer program runs on the computer, the computer is caused to execute the corresponding procedures implemented by the network device in each method of the embodiment of the disclosure. For the sake of brevity, details are not repeated here.

In an embodiment, the computer program may be applied to the mobile terminal/terminal in the embodiment of the disclosure. When the computer program runs on the computer, the computer can execute the corresponding procedures implemented by the mobile terminal/terminal in each method of the embodiment of the disclosure. For the sake of brevity, details are not repeated here.

A person of ordinary skilled in the art may be aware that the units and algorithm operations of the examples described in the embodiments disclosed herein may be implemented by electronic hardware or a combination of computer software and electronic hardware. Whether these functions are executed by hardware or software depends on the specific application and design constraints of the technical solution. Professionals and technicians can use different methods to implement the described functions of each specific application, but such implementation should not be considered beyond the scope of the disclosure.

Those skilled in the art may clearly understand that, for the convenience and conciseness of the description, the specific working process of the above-described system, apparatus and unit may refer to the corresponding procedures in the foregoing method embodiments, which will not be repeated here.

In the several embodiments provided by the disclosure, it should be understood that the disclosed system, apparatus and method may be implemented in other ways. For example, the apparatus embodiments described above are only illustrative. For example, the division of the units is only a logical function division, and there may be other divisions in actual implementation. For example, multiple units or components may be combined or integrated into another system, or some features may be ignored or not implemented. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the present embodiments.

In addition, the functional units in each embodiment of the disclosure may be integrated into one processing unit, or each unit may exist separately and physically, or two or more units may be integrated into one unit.

If the function is implemented in the form of a software functional unit and is sold or used as an independent product, it can be stored in a computer readable storage medium. Based on such an understanding, the technical solution of the disclosure or the part that contributes to the related art or the part of the technical solution may be embodied in the form of a software product essentially, and the computer software product is stored in a storage medium including several indications to make a computer device (which may be a personal computer, a server or a network device, etc.) execute all or part of the operations of the methods described in the each embodiment of the disclosure. The aforementioned storage medium includes: U disks, mobile hard disks, read-only memories (ROM), random access memories (RAM), magnetic disks or optical disks and other media that can store program codes.

The foregoing is only the specific implementation mode of the disclosure. However, the protection scope of the disclosure is not limited thereto. Any variations or replacements apparent to those skilled in the art within the technical scope disclosed by the present disclosure shall fall within the protection scope of the present disclosure. Therefore, the protection scope of the disclosure shall be subject to the protection scope of the claims.

The invention claimed is:

1. A method for information indication, the method comprising:
    determining, by a mobile terminal according to a first indication information carried in a Media Access Control Control Element (MAC CE) or in a Radio Resource Control (RRC) signaling, whether to release a mapping relationship between a first logical channel and a first physical carrier set, after receiving a first message, from a base station, used for indicating deactivation of a duplicate data transmission function, wherein after the mapping relationship between the first logical channel and the first physical carrier set is released, data of the first logical channel is capable of being transmitted on all authorized carriers configured for the mobile terminal.

2. The method of claim 1, wherein
the first indication information is carried in an MAC CE or in an MAC CE used for indicating the deactivation of the duplicate data transmission function; or,
the first indication information is carried in an RRC signaling used for indicating the deactivation of the duplicate data transmission function.

3. The method of claim 1, wherein the first indication information comprises a first parameter configured in the first logical channel, wherein a radio bearer corresponding to the first logical channel is configured with the duplicate data transmission function.

4. The method of claim 3, wherein the terminal deactivates the duplicate data transmission function of the radio bearer corresponding to the first logical channel after receiving the first message used for indicating the deactivation of the duplicate data transmission function, and determines, according to the first parameter, whether to release the mapping relationship between the first logical channel and the first physical carrier set.

5. The method of claim 4, wherein determining, according to the first parameter, whether to release the mapping relationship between the first logical channel and the first physical carrier set comprises:
responsive to a value of the first parameter being a first value, releasing the mapping relationship between the first logical channel and the first physical carrier set;
responsive to the value of the first parameter being a second value, not releasing the mapping relationship between the first logical channel and the first physical carrier set.

6. The method of claim 1, wherein the first indication information comprises configuration information of a second physical carrier set, wherein the configuration information of the second physical carrier set is configured in the first logical channel, and a radio bearer corresponding to the first logical channel is configured with the duplicate data transmission function.

7. The method of claim 6, wherein after receiving the first message used for indicating the deactivation of the duplicate data transmission function, the terminal deactivates the duplicate data transmission function of the radio bearer corresponding to the first logical channel, releases the mapping relationship between the first logical channel and the first physical carrier set, and maps the first logical channel to the second physical carrier set.

8. The method of claim 7, wherein after the first logical channel is mapped to the second physical carrier set, data of the first logical channel is capable of being transmitted on the second physical carrier set.

9. An apparatus for information indication, comprising:
a memory storing processor-executable instructions; and
a processor configured to execute the stored processor-executable instructions to perform an operation of:
determining, by a mobile terminal according to a first indication information carried in a Media Access Control Control Element (MAC CE) or in a Radio Resource Control (RRC) signaling, whether to release a mapping relationship between a first logical channel and a first physical carrier set, after receiving a first message, from a base station, used for indicating deactivation of a duplicate data transmission function,
wherein after the mapping relationship between the first logical channel and the first physical carrier set is released, data of the first logical channel is capable of being transmitted on all authorized carriers configured for the mobile terminal.

10. The apparatus of claim 9, wherein
the first indication information is carried in an MAC CE or in an MAC CE used for indicating the deactivation of the duplicate data transmission function; or,
the first indication information is carried in an RRC signaling used for indicating the deactivation of the duplicate data transmission function.

11. The apparatus of claim 9, wherein the first indication information comprises a first parameter configured in the first logical channel, wherein a radio bearer corresponding to the first logical channel is configured with the duplicate data transmission function.

12. The apparatus of claim 11, wherein the processor is configured to execute the stored processor-executable instructions to further perform an operation of:
deactivating the duplicate data transmission function of the radio bearer corresponding to the first logical channel after the first message used for indicating the deactivation of the duplicate data transmission function is received; and
determining, according to the first parameter, whether to release the mapping relationship between the first logical channel and the first physical carrier set.

13. The apparatus of claim 12, wherein determining, according to the first parameter, whether to release the mapping relationship between the first logical channel and the first physical carrier set comprises:
determining to release the mapping relationship between the first logical channel and the first physical carrier set, responsive to a value of the first parameter being a first value; and
determining not to release the mapping relationship between the first logical channel and the first physical carrier set, responsive to the value of the first parameter being a second value.

14. The apparatus of claim 9, wherein the first indication information comprises configuration information of a second physical carrier set, wherein the configuration information of the second physical carrier set is configured in the first logical channel, and a radio bearer corresponding to the first logical channel is configured with the duplicate data transmission function.

15. The apparatus of claim 14, wherein the processor is configured to execute the stored processor-executable instructions to further perform operations of: after receiving the first message used for indicating the deactivation of the duplicate data transmission function,
deactivating the duplicate data transmission function of the radio bearer corresponding to the first logical channel;
releasing the mapping relationship between the first logical channel and the first physical carrier set; and
mapping the first logical channel to the second physical carrier set.

16. The apparatus of claim 15, wherein after the first logical channel is mapped to the second physical carrier set, data of the first logical channel is capable of being transmitted on the second physical carrier set.

* * * * *